(12) United States Patent
Cheng

(10) Patent No.: US 7,015,936 B2
(45) Date of Patent: Mar. 21, 2006

(54) SCALING METHOD BY USING DUAL POINT CUBIC-LIKE SLOPE CONTROL (DPCSC)

(75) Inventor: Kun-Nan Cheng, Hsinchu (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 338 days.

(21) Appl. No.: 10/345,037

(22) Filed: Jan. 14, 2003

(65) Prior Publication Data

US 2003/0189580 A1 Oct. 9, 2003

Related U.S. Application Data

(60) Provisional application No. 60/369,532, filed on Apr. 1, 2002.

(51) Int. Cl.
G09G 5/00 (2006.01)

(52) U.S. Cl. ........................................ 345/660; 345/666
(58) Field of Classification Search ................ 345/660, 345/668, 669, 665, 615, 619; 382/279, 276
See application file for complete search history.

(56) References Cited

U.S. PATENT DOCUMENTS

| 5,379,241 A | 1/1995 | Greggain |
| 5,502,662 A | 3/1996 | Greggain |
| 6,687,417 B1 * | 2/2004 | Bradley et al. ............. 345/615 |

OTHER PUBLICATIONS

Bourke, P. "Bicubic Interpolation for Image Scaling", May 2001.*

* cited by examiner

*Primary Examiner*—Sumati Lefkowitz
*Assistant Examiner*—Chante Harrison
(74) *Attorney, Agent, or Firm*—J.C. Patents

(57) ABSTRACT

A method using a dual point cubic-like slope (DPCSC) for scaling a source data to a destination data, wherein a function f(x) is determined to describe the destination data, in which x is a deviation from a current reference point 0, and two reference data of f(0) and f(1) are used as reference data. The method comprises setting an initial condition about a slope D with respect to the function f(x) at the point 0, a gain factor G to time the slope D, and f'(0)=f'(1)=DG. The f(x) is a quadratic equation of $f(x)=ax^2+bx+c$, which should pass f(0), f(1), and a middle point f(0.5) by a quantity of f(0.5)=[f(0)+f(1)]/2. The coefficients of a, b, and, c, are solved in two ranges of $0 \leq x < 0.5$ and $0.5 \leq x < 1$, so as to obtain the function f(x), with a joint at the middle point. The foregoing steps are repeated for scaling data in a next source data region. The function preferable is chosen to be symmetric to the middle point.

15 Claims, 4 Drawing Sheets

SCALING METHOD BY USING DUAL POINT CUBIC-LIKE SLOPE CONTROL (DPCSC)

CROSS-REFERENCE TO RELATED APPLICATION

This application claims the priority benefit of U.S. provisional application titled "DUAL POINTS CUBIC-LIKE SLOPE CONTROL (DPCSC) SCALING" filed on Apr. 1, 2002, Ser. No. 60/369,532. All disclosures of this application is incorporated herein by reference.

BACKGROUND OF THE INVENTION

Field of the Invention

The present invention relates to a method of data interpolation, and more particularly to a method of scaling up or down of different types of data such as graphics, image, video or audio data, and for application of polygon curve fitting in many area such as object moving tracking analysis, data analysis, a finder for object 2D shape or 3D surface in graphic area.

Scaling is useful in graphics, image, video or audio application for expanding or shrinking sample resolution and for zooming. Especially in digital display device with fixed resolution, different kinds of source image format must be scaled to fit the resolution of the digital display.

For example, a display panel may have fixed resolution of 1024×768 pixels in XGA mode, but the source image may come from computer, video decoder, or others that the input resolution varies depending on the input modes. The input source in VGA mode (640×480 pixels) with resolution less that of display mode XGA needs to be scaled up when displayed on the XGA panel. On the other hand, an input source in SXGA mode (1280×1024 pixels) with resolution greater than that of display mode XGA needs to be scaled down when displayed on the XGA panel. Image resizing is very important for digital display devices such as LCD. Various conventional well-known methods such as Bilinear, Cubic, B-Spline, Besier have been proposed to achieve a good filtering effect for scaling purposes.

The Bilinear method is the most commonly used method of interpolation. It benefits in its simplicity and cost because only 2 reference points are taken. As a result, the cost of the implementation of the Bilinear method is low because computation and storage requirements are less compared to other high-order interpolation methods. However the output of the Bilinear method is blurry due to lack of sharpness from the interpolation results and therefore is not suitable for text image. The sharpness of the picture quality depends on curve after fitting the interpolation points. The Bilinear method takes the weighting average as the interpolation result. Consider two neighbor pixels A, B, if the interpolation point C is located between A and B with distance D (D≦1) from A, then the interpolation result according to the Bilinear method is $$C = A(1-D) + BD \qquad \text{Eq. 1}$$

Cubic or B-Spline methods are the more preferred methods used in high quality scaling system with almost perfect scaling quality, but the cost is very high for computation and storage. Cubic methods usually require 4 points f(−1), f(0), f(1), and f(2) as reference. The Cubic Curve using the Hermite Method has a start point $P_1$, an end point $P_2$, a start point tangent-vector $R_1$, and an end point tangent-vector $R_2$ by the formula as follows:

$$f(x) = (2x^3 - 3x^2 + 1)P_1 + (-2x^3 + 3x^2)P_2 + (x^3 - 2x^2 + x)R_1 + (x^3 - x^2)R_2 \qquad \text{Eq. 2}$$

$$= (2P_1 - 2P_2 + R_1 + R_2)x^3 + (-3P_1 + 3P_2 - 2R_1 - R_2)x^2 + R_1 x + P_1 \qquad \text{Eq. 3}$$

where $P_1 = f(0)$, $P_2 = f(1)$ $R_1 = G_1(P_2 - P_0)/2 = G_1[f(1) - f(-1)]/2 = $ tangent-vector at $P1$ $R_2 = G_2(P_3 - P_1)/2 = G_2[f(2) - f(0)]/2 = $ tangent-vector at $P2$ $G_1$ and $G_2$ are gain factors, wherein the gain factors relate to image sharpness.

In the foregoing two conventional methods, Bilinear method can be easily implemented. However, the interpolation result only depends on quantities of two points. When the change of quantity at certain region ranging has large variation, the image after scaling would lose the fidelity. For the Cubic or B-Spline methods, more information is included, but the implement would be more complex and the cost is high. The computation is more tedious. So, the foregoing conventional methods still have their disadvantages.

SUMMARY OF THE INVENTION

The present invention provides a low cost and high performance scaling algorithm of dual point cubic-like slope control (DPCSC) method for both shrinking and zooming purposes by a quadratic equation. The quality of the DPCSC scaling method can be compared with the Cubic or B-Spline methods, while keeping the cost approximately equal to that of the Bilinear method.

The DPCSC scaling method of the present invention only requires the minimum of 2 reference points so therefore computation and storage requirement are less than that of Cubic or B-Spline methods and equal to the minimal size of Bilinear method. Each piece of destination data can be generated only with 2 reference points as reference. A slope control is used to control the sharpness of the interpolation result. The interpolation curve starts from one of the 2 neighbor reference points, with a slope $S_1$ define at the reference point, and pass the middle point of the 2 neighbor pixels, then end at the other reference point of the 2 neighbor reference point with a slope $S_2$ the same as the slope $S_1$. Different start point slope gain DG affects the scaling quality, and can be adjusted according to the different scaling requirement. Also, Z transform is applied to minimize the computing complexity.

A method using a dual point cubic-like slope control (DPCSC) for scaling a source data to a destination data, wherein a function f(x) is determined to describe the destination data, in which x is a deviation from a current reference point 0, and two reference data of f(0) and f(1) are used as reference data. The method comprises the step of setting an initial condition about a slope D with respect to the function f(x) at the point 0, a gain factor G to time the slope D, and f'(0)=f'(1)=DG. The f(x) is a quadratic equation of f(x)=ax$^2$+bx+c, which should pass f(0), f(1), and a middle point f(0.5) by a quantity of f(0.5)=[f(0)+f(1)]/2. The coefficients of a, b, and, c, are solved in two ranges of 0≦x<0.5 and 0.5≦x<1, so as to obtain the function f(x), with a joint at the middle point f(0.5). The foregoing steps are repeated for scaling data in a next source data region.

The function is chosen preferably to be symmetric to the middle point.

It is to be understood that both the foregoing general description and the following detailed description are exemplary, and are intended to provide further explanation of the invention as claimed.

BRIEF DESCRIPTIOIN OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 is a schematic diagram illustrating the curve using the DPCSC scaling method of present invention;

DETAILED DESCRIPTION OF THE PREFERRED EMBODIMENTS

According to the present invention, two adjacent reference points f(0) and f(1) are required to generate a fitting curve f(x)=ax$^2$+bx+c within a concerning region of 0≦x<1, wherein the points f(0) and f(1) represent a start point and an end point, respectively. The reference points f(0) and f(1) designate known sample data of graphics, image, video or audio signals. Moreover, the fitting curve f(x) is generated for passing through a middle point f(0.5) which is spaced equally from the reference points f(0) and f(1) and defined to be the mean value of the reference points f(0) and f(1). By setting a start point slope f'(0) and an end point slope f'(1) to be equal, the resulting function f(x) can be used to specify the scaled data, accordingly.

Figure 1:
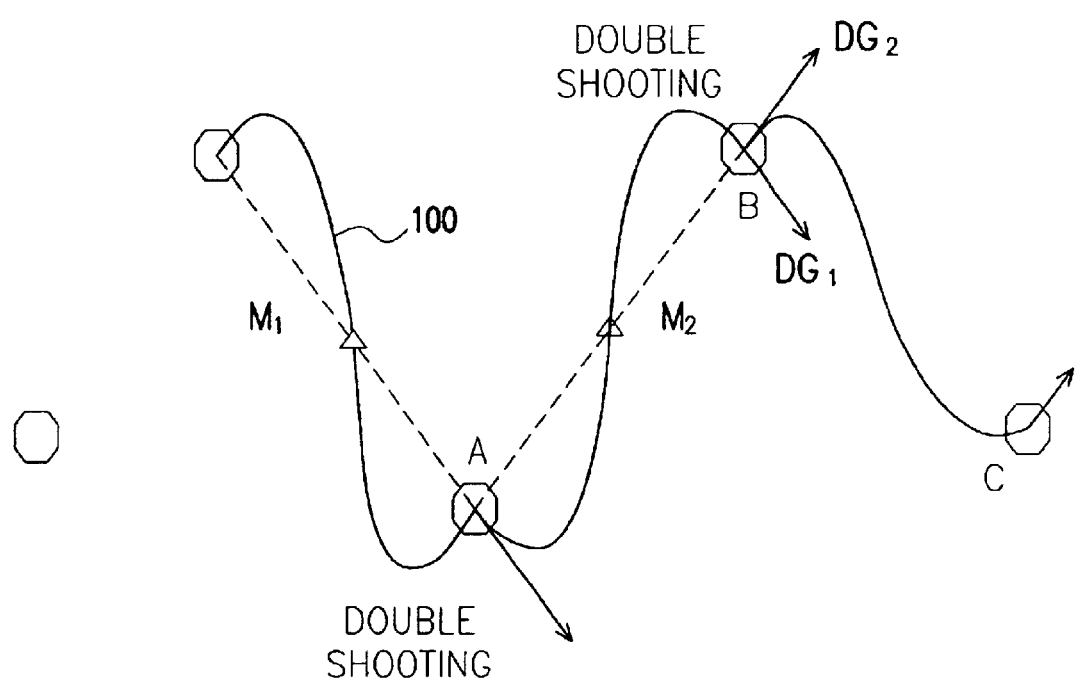

FIG. 1 depicts a fitting curve in accordance with the DPCSC scaling method of the present invention. The source reference points A, B and C are designated as octagon symbols. A curve 100 is the resulting curve fitted by means of the DPCSC scaling method. $M_1$ and $M_2$ represent middle points, each of which is located at the midway of two adjacent reference points. For example, the middle point $M_2$ is located between the reference points A and B and spaced equally from the reference points A and B. It is noted that two slopes are provided for each reference point. For example, two slopes $DG_1$ and $DG_2$ are provided at the reference point B, wherein the slope $DG_1$ is applied when the point B serves as the end point for fitting the curve between the points A and B, and the slope $DG_2$ is applied when the point B serves as the start point for fitting the curve between the points B and C. Furthermore, "double shooting" may occur near the reference point which has a value greater or smaller than two adjacent reference points both. The "double shooting" is supposed to increase image sharpness, especially in the application of text image display.

The details of the DPCSC scaling method in accordance with the present invention are described as follows:

Assume $f(x)=ax^2+bx+c$      Eq. 4

Then, $f'(x)=2ax+b$.      Eq. 5

By considering two adjacent reference points at x=0 and x=1 and the middle point at x=0.5, the concerning region of 0≦x<1 can be divided into two subregions of 0≦x<0.5 and of 0.5≦x<1 in term of x-coordinate.

Because f(0) and f(1) are known sample data, we define:

M (middle point)=$f(0.5)=0.5[f(0)+f(1)]$

D (end/start point slope)=$f'(0)=f'(1)=-(Sign)[f(1)-f(0)]=(Sign)[f(0)-f(1)]$.

G is a given gain factor, preferably G≧0; Sign can be +1 or −1, while +1 is taken as an example.

According to the present invention, the start point slope f'(0) and the end point slope f'(1) are set to be equal, $f'(0)=f'(1)=DG$ Thus, for the subregion of 0≦x<0.5:

$f(0)=c$      Eq. 6

$f'(0)=b=[f(0)-f(1)]G=DG$      Eq. 7

$f(0.5)=0.25a+0.5b+c=0.5[f(0)+f(1)]=M$      Eq. 8

But, for the subregion of 0.5≦x<1:

$f(1)=a+b+c$      Eq. 9

$f'(1)=2a+b=[f(0)-f(1)]G=DG$      Eq. 10

$f(0.5)=0.25a+0.5b+c=0.5[f(0)+f(1)]=M$      Eq. 11

Therefore, for the subregion of 0≦x<0.5

$f(x)=2[f(1)-f(0)-DG]x^2+(DG)x+f(0)$      Eq. 12 for the subregion of 0.5≦x<1

$f(x)=2[DG+f(0)-f(1)]x^2+[4f(1)-4f(0)-3DG]x+[DG-f(1)+2f(0)]$      Eq. 13

Figure 2:
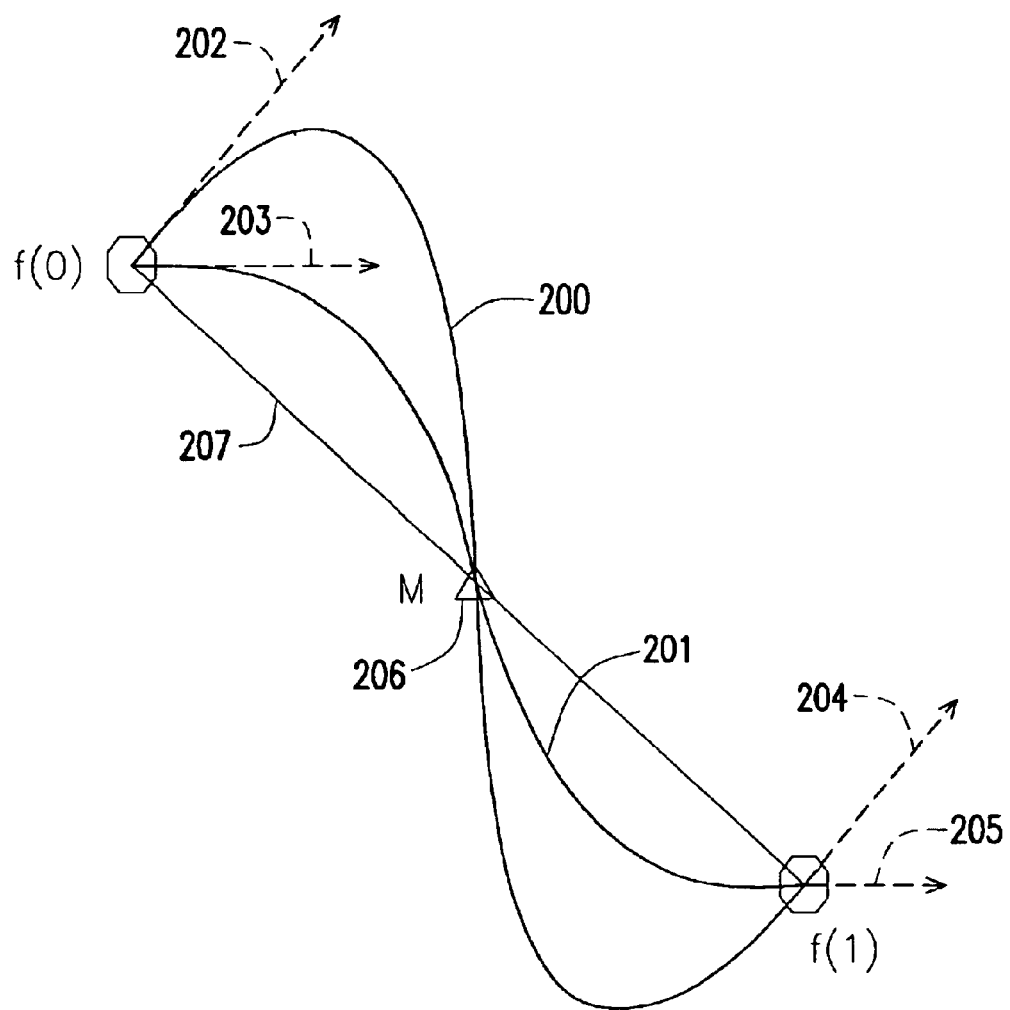
FIG. 2 is a schematic diagram illustrating the behavior using the DPCSC scaling method with different gain of slope at the start reference point.

FIG. 2 shows resulting curves in accordance with the DPCSC scaling method by using different gain factors. The Bilinear curve 207 is illustrated for comparison. Reference numeral 200 represents the fitting curve using the DPCSC scaling method with a start point slope 202 and an end point slope 204, wherein both slopes 202 and 204 are substantially the same. Reference numeral 201 represents the fitting curve using DPCSC scaling method with a start point slope 203 and an end point slope 205, wherein both slopes 203 and 205 are substantially the same. As shown in FIG. 2, the slopes 202 and 204 are greater than the slopes 203 and 205 so that the curve 200 is sharper than the curve 201. For the same reason, the gain factor G can be employed to adjust the shape of the fitting curve.

The hardware cost is listed in the following Table I:

TABLE I

| | Parameter | Adder | Multiplier | Notes |
|---|---|---|---|---|
| $0 \leq x < 0.5$ | $DG = [f(0) - f(1)] G$ | 1 | 1 | $f(0) - f(1)$ can't be shared |
| | $a = 2[f(1) - f(0) - DG]$ | 2 | 0 | $f(1) - f(0)$ can't be shared |
| | $b = DG$ | 0 | 0 | |
| | $c = f(0)$ | 0 | 0 | |
| | Sub-Total | 3 | 1 | |
| $0.5 \leq x < 1$ | $DG = [f(0) - f(1)] G$ | 1 | 1 | $F(0) - f(1)$ can be shared |
| | $a = 2[DG + f(0) - f(1)]$ | 1 | 0 | |
| | $b = [4f(1) - 4f(0) - 3DG]$ | 3 | 0 | $f(1) - f(0)$ can't be shared |
| | $c = [DG - f(1) + 2f(0)]$ | 2 | 0 | |
| | Sub-Total | 7 | 1 | |

As shown in Table I, seven adders are required for fitting the curve within the subregion of $0.5 \leq x < 1$ so that the hardware cost is quite high. Therefore, coordinate transformation can be utilized to reduce the hardware cost. By applying a z-coordinate, which has the relationship with x-coordinate as follows:

$$F(z) = az^2 + bz + c \quad \text{Eq. 14}$$

$$F'(z) = 2az + b; \quad \text{Eq. 15}$$

For the subregion of $0.5 \leq x < 1$ $$Z(z) = X(x) - 1 \quad \text{Eq. 16}$$

Therefore, $$Z(0) = X(1) \quad \text{Eq. 17}$$

$$Z(-0.5) = X(0.5) \quad \text{Eq. 18}$$

Apply D, M, f(1), and a gain factor G as the initial conditions, therefore $$F(0) = c = f(1) \quad \text{Eq. 19}$$

$$F'(0) = b = [f(0) - f(1)]G = DG \quad \text{Eq. 20}$$

$$F(-0.5) = 0.25a - 0.5b + c = M = 0.5[f(0) + f(1)] \quad \text{Eq. 21}$$

thus $$F(z) = 2[f(0) - f(1) + DG]z^2 + (DG)z + f(1) \quad \text{(Eq. 22)}$$

The cost of the required hardware implemented by means of z-coordinate is listed in Table II:

TABLE II

| | Parameter | Adder | Multiplier | Note |
|---|---|---|---|---|
| $0.5 \leq x < 1$ | $DG = [f(0) - f(1)]G$ | 1 | 1 | $f(0) - f(1)$ can be shared |
| | $a = 2[f(0) - f(1) + DG]$ | 1 | 0 | |
| | $b = DG$ | 0 | 0 | |
| | $c = f(1)$ | 0 | 0 | |
| | Sub-Total | 2 | 1 | |

Accordingly, by applying Z-transform to the equation f(x), the number of the required adders within the subregion of $0.5 \leq x < 1$ is brought down to two from its original seven.

Moreover, the coordinate transform of $Z(z) = X(x) - 1$ can be implemented by bit mapping method, which requires no more than a half adder. Though one set of f(x) is exemplified in this embodiment, it should be understood that three sets of f(x) may be required for processing red, green and blue image signals in the true-color display system.

Because the multiplier can be implemented by means of a shifter (i.e., 4×, 2×, 1×, 0.5×, 0.25×), the cost of hardware implementation primarily depends on the required adder count. As mentioned above, the DPCSC scaling method using Z-transform can reduce the adder count from 7 to 2 for the subregion of $0.5 \leq x < 1$ which is even less than the adder count required for the subregion of $0 \leq x < 0.5$. Thus, the hardware cost according to the DPCSC scaling method of the present invention can be reduced more than one half.

Figure 3:
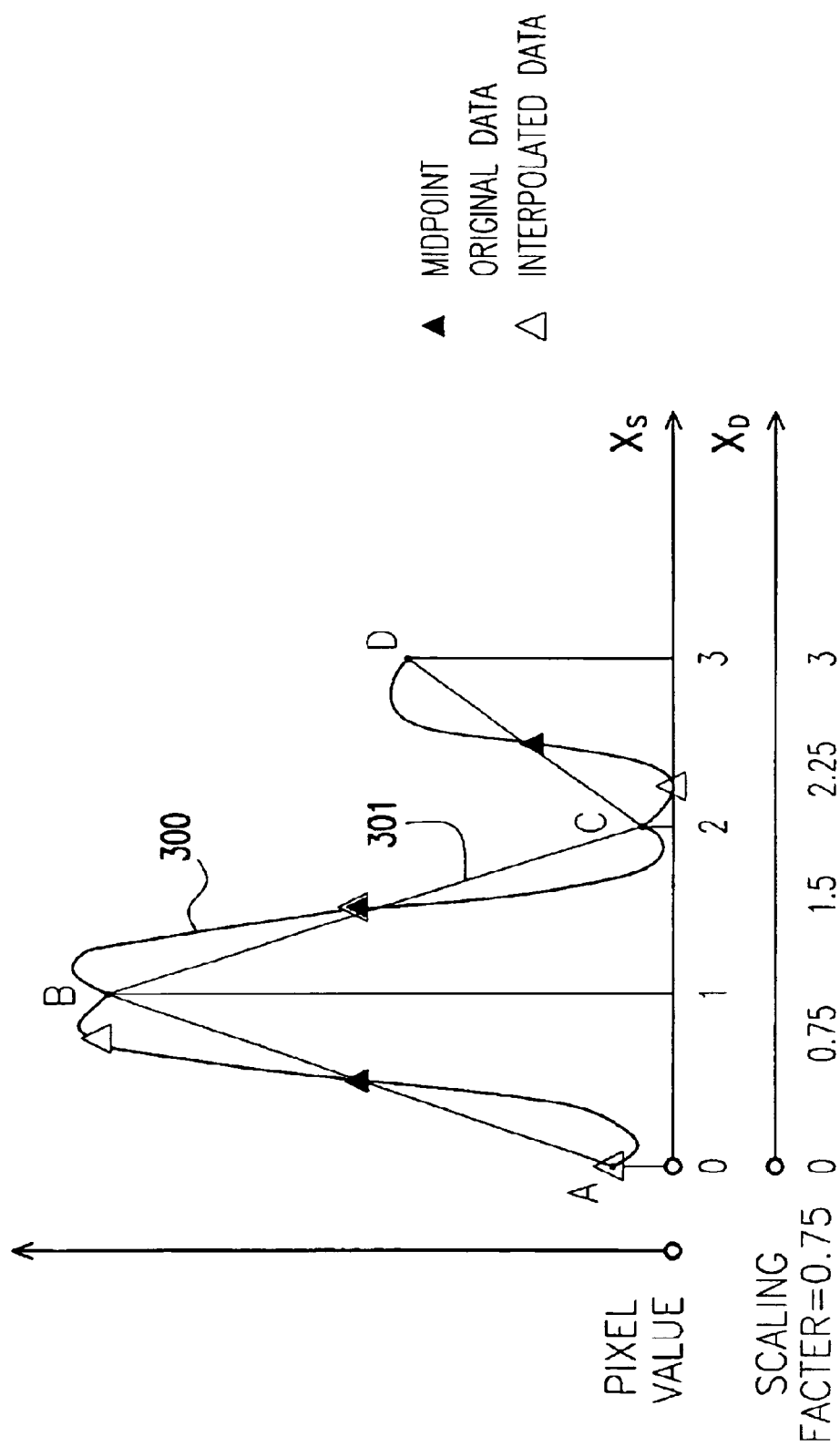
FIG. 3 is a schematic diagram illustrating the upscaling result in accordance with the DPCSC scaling method of the present invention by taking a scaling factor of 0.75 as an example.

FIG. 3 is a schematic diagram illustrating the upscaling result in accordance with the DPCSC scaling method of the present invention by taking a scaling factor of 0.75 as an example Reference numeral 300 is the fitting curve using DPCSC scaling method, and reference numeral 301 is the fitting curve by means of Bilinear method. The $X_S$ 302 is the source data location, while the $X_D$ 303 is the destination data location. For zoom and shrink purpose, the procedure comprises the following steps:

a. $X_S$ denotes the position coordinate with sample data $D_0$, $D_1$, $D_2$, $D_3$ ... $D_M$, wherein x=0, 1, 2, 3, ..., M b. A scaling factor generator generates the interpolation location $X_D$. The scaling factor is decided by (input resolution)/(output resolution), and in this case use 0.75 as an example. Scaling factor <1 is an up scaling case, while scaling factor >1 is a down scaling case. For interpolation points x locate between the coordinate x=N to x=N+1.

Given: $f(0) = D_N$
$f(1) = D_{N+1}$ and x=0 ... 1 (truncate the integer part N) for $0 \leq x < 0.5$, $$f(x) = 2[f(1) - f(0) - DG]x^2 + (DG)x + f(0) \quad \text{Eq. 23}$$

c. find the solution of the curve f(x) for $0.5 \leq x < 1$, $$f(x) = 2[DG + f(0) - f(1)]x^2 + [4f(1) - 4f(0) - 3DG]x + [DG - f(1) + 2f(0)] \quad \text{Eq. 24}$$

or apply Z transform of $Z(z) = X(x) - 1$ to get F(z)

$$F(z) = 2[f(0) - f(1) + DG]z^2 + (DG)z + f(1) \quad \text{Eq. 25}$$

for the range x=0.5 ... 1 change to z=−0.5 ... 0 d. Find F(z) at point x, whereas F(z) denotes the data after scaling or shrink at point x.

Figure 4:
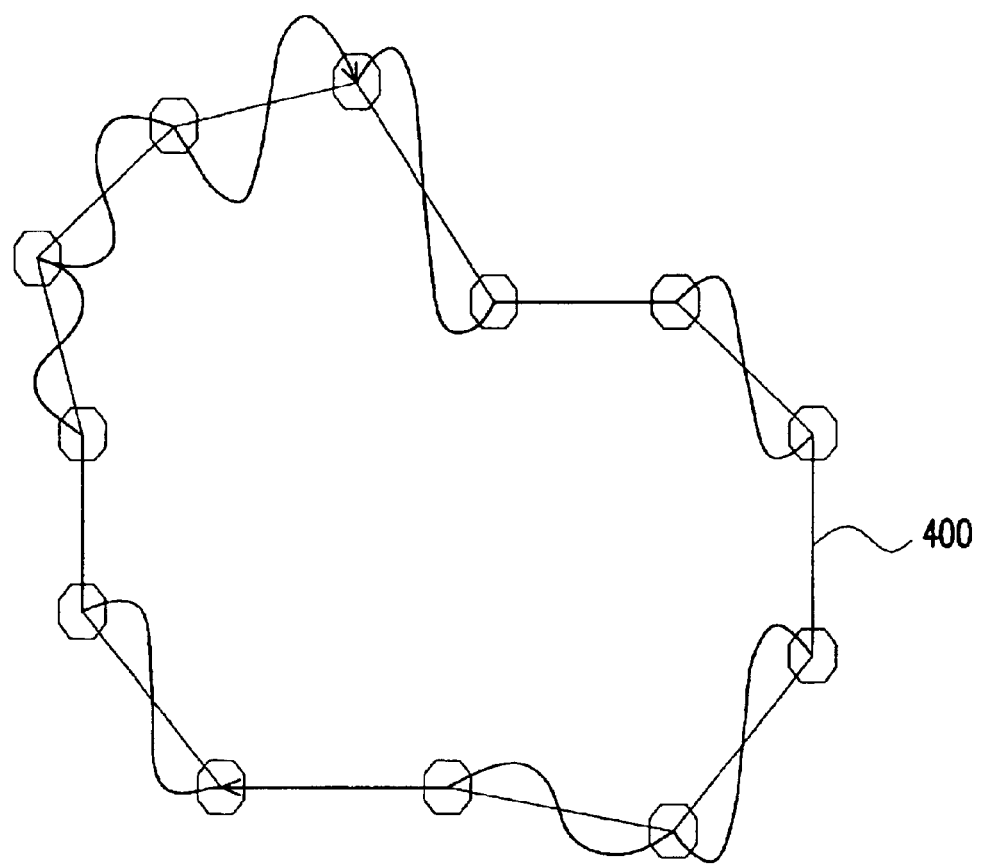
FIG. 4 is a schematic diagram showing the fitting result of a 2D object in accordance with the DPCSC scaling method of the present invention.

The DPCSC scaling method is especially good for zooming or shrinking in graphic, image, video or audio, but also suitable for application of polygon curve fitting in many area such as object moving tracking analysis, data analysis, a finder for object 2D shape or 3D surface in graphic area FIG. 4 is a schematic diagram showing the fitting result of a 2D object in accordance with the DPCSC scaling method of the present invention. A fitting curve 400 is formed to designate the boundary of the 2D object surrounded by the reference points. It can be seen from FIG. 4 that the fitting curve 400 using the DPCSC scaling method of the present invention has sharper apexes which results in the generation of crispier and sharper image.

The foregoing method can be implemented into a circuit or a system to perform the scaling function. For a circuit, it can for example, include an initial part, a calculation part, and a scaling part to respectively set the initial condition, solving the function, and scaling the source data. The scaling function can also be adapted into a system. Basically, the hardware implementation for the scaling method of the present invention should be known by the skilled persons.

The DPCSC scaling method of the present invention provides a low cost and high performance image-scaling approach as compared to the conventional Cubic or B-Spline method. The scaling quality can be controlled by tuning the DG value at the start point and the end point. The computation, processing, and storage requirement are only a little bit greater than that of Bilinear method but considerably less than that of Cubic or B-Spline method because DPCSC scaling method only requires 2 reference points. Furthermore, a sharper and crispier image is achieved in scaling up a source image as compared to the blurry image output using the Bilinear method. It is very important during vertical scaling that the whole line of image data must stored as a whole in the line buffer. The more the reference points, means more line buffers are required but the DPCSC scaling method of the present invention only requires a minimum of 2 line buffers for 2 reference points. The present invention is excellent in many applications like in scaling of graphic, image, video, audio, or polygon curve fitting applications, moving tracking analysis, data analysis, or finder for object 2D shape or 3D surface in graphic area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for scaling data from source data to destination data used in a scaling device, wherein the scaling device is to determine a function f(x) to describe the destination data, in which x is a deviation from a current reference point 0, and two reference data of f(0) and f(1) are used as reference data, the method comprising:

setting an initial condition about a slope D with respect to the function f (x) at the point 0, a gain factor G to time the slope D, and f'(0)=f'(1)=DG, wherein the initial condition is stored in the scaling device;

setting the f(x) stored in the scaling device as a quadratic equation of $f(x)=ax^2+bx+c$, which should pass f(0), f(1), and a middle point f(0.5) by a quantity of f(0.5)=[f(0)+f(1)]/2;

solving coefficients of a, b, and, c by the scaling device, in two ranges of $0 \leq x<0.5$ and $0.5 \leq x<1$, so as to obtain the function f(x), with a joint at the middle point, wherein the solved function f(x) is used to scale the source data to the destination data; and repeating the foregoing steps for a next source data.

2. The method as claimed in claim 1, wherein the function f(x) with the range of $0 \leq x<1$ is symmetric to the middle point.

3. The method as claimed in claim 1, wherein the initial condition and the function f(x) are determined by:

setting the initial condition that f'(0)=f'(1)=DG=(sign)[f (0)−f(1)]G, wherein sign is +1 or −1; and setting $f(x)=2[f(1)-f(0)-DG]x^2(DG)x+f(0)$ for the range of $0 \leq x<0.5$; and setting $f(x)=2[DG+f(0)-f(1)]x^2+[4f(1)-4f(0)-3DG]x+[DG-f(1)+2f(0)]$ for the range of $0.5 \leq x<1$.

4. The method as claimed in claim 1, wherein the coefficients a, b, and c of the function f(x) are determined by:

for $0 \leq x<0.5$, setting $f(0)=c$ $f'(0)=b=[f(0)-f(1)]G=DG$ $f(0.5)=0.25a+0.5b+c=0.5[f(0)+f(1)]$, to solve the coefficients *a, b,* and *c;* and for $0.5 \leq x<1$, setting $f(1)=a+b+c$ $f'(1)=2a+b=[f(0)-f(1)]G=DG$ $f(0.5)=0.25a+0.5b+c=0.5[f(0)+f(1)]$ to solve the coefficients *a, b,* and *c*.

5. The method as claimed in claim 1, wherein the function is determined by setting $f(x)=2[f(1)-f(0)-DG]x^2(DG)x+f(0)$ for $0 \leq x<0.5$; and $F(z)=2[f(0)-f(1)+DG]z^2+(DG)z+f(1)$ for $-0.5 \leq z<0$, wherein Z-transform of $Z(z)=X(x)-1$ is applied.

6. The method as claimed in claim 5, further comprising solving the coefficients a, b, and c of the function f(x) based on the following equations:

for $0 \leq x<0.5$:

$f(0)=c$ $f'(0)=b=[f(0)-f(1)]G=DG$ $f(0.5)=0.25a+0.5b+c=0.5[f(0)+f(1)]$; and for $-0.5 \leq z<0$ $F(0)=c=f(1)$ $F'(0)=b=[f(0)-f(1)]G=DG$ $F(-0.5)=0.25a-0.5b+c=M=0.5[f(0)+f(1)]$.

7. A scaling apparatus, configured with a scaling function f(x) to scale source data into output data, wherein x is a deviation from a current reference point 0, and two reference data of f(0) and f(1) are used as reference data, the apparatus comprising:

an initial oneration part to set an initial condition about a slope D with respect to the function f(x) at the point 0, a gain factor G to time the slope D, and f'(0)=f'(1)=DG, wherein the f(x) is a quadratic equation of $f(x)=ax^2+bx+c$, which should pass f(0), f(1), and a middle point f(0.5) by a quantity of f(0.5)=[f(0)+f(1)]/2;

a calculation operation part to solve the coefficients of a, b, and, c, in two ranges of $0 \leq x<0.5$ and $0.5 \leq x<1$, so as to obtain the function f(x), with a joint at the middle point; and a scaling operation part to scale the source data based on the solved function f(x).

8. The apparatus as claimed in claim 7, wherein the function f(x) with the range of $0 \leq x<1$ is symmetric to the middle point.

9. The apparatus as claimed in claim 7, wherein the initial condition is f'(0)=f'(1)=DG=(sign)[f(0)−f(1)]G, wherein sign is +1 or −1; and the function f(x) is $f(x)=2[f(1)-f(0)-DG]x^2+(DG)x+f(0)$ for the range of $0 \leq x<0.5$; and $f(x)=2[DG+f(0)-f(1)]x^2+[4f(1)-4f(0)-3DG]x+[DG-f(1)-2f(0)]$ for the range of $0.5 \leq x<1$.

10. The apparatus as claimed in claim 7, wherein the coefficients a, b, and c of the function f(x) axe a solution of the following equations:

for $0 \leq x<0.5$, setting $f(0)=c$ $f'(0)=b=[f(0)-f(1)]G=DG$ $f(0.5)=0.25a+0.5b+c=0.5[f(0)+f(1)]$, to solve the coefficients a, b, and c; and for $0.5 \leq x<1$, setting $f(1)=a+b+c$ $f'(1)=2a+b=[f(0)-f(1)]G=DG$ $f(0.5)=0.25a+0.5b+c=0.5[f(0)+f(1)]$ to solve the coefficients $a, b,$ and $c$.

11. The apparatus as claimed in claim 7, wherein the function f(x) is:

$f(x)=2[f(1)-f(0)-DG]x^2+(DG)x+f(0)$ for $0 \leq x<0.5$; and $F(z)=2[f(0)-f(1)+DG]z^2+(DG)z+f(1)$ for $-0.5 \leq z<0$, wherein Z-transform of $Z(z)=X(x)-1$ is applied.

12. The apparatus as claimed in claim 11, wherein the coefficients a, b, and c of the function f(x) are a solution of the following equations:

for $0 \leq x<0.5$:

$f(0)=c$ $f'(0)=b=[f(0)-f(1)]G=DG$ $f(0.5)=0.25a+0.5b+c=0.5[f(0)+f(1)]$; and for $-0.5 \leq z<0$ $F(0)=c=f(1)$ $F'(0)=b=[f(0)-f(1)]G=DG$ $F(-0.5)=0.25a-0.5b+c=M=0.5[f(0)+f(1)]$.

13. A method used in a scaling device for generating destination data samples f(x) in response to two source data samples f(0) and f(1), wherein f(x) is generated for x in a range of $0 \leq x<1$, said method comprising the steps of:

(a) generating a middle point sample f(0.5) by defining $f(0.5)=[f(0)+f(1)]/2$, wherein step (a) is implemented in the scaling device;

(b) fitting a quadratic equation of $f(x)=ax^2+bx+c$ to said source data samples f(0) and f(1) and said middle point sample f(0.5), wherein the step (b) is implemented in the scaling device; and (c) generating a resulting equation $f(x)=2[f(1)-f(0)-DG]x^2+(DG)x+f(0)$ for one subregion of $0 \leq x<0.5$ and $f(x)=2[DG+f(0)-f(1)]x^2+[4f(1)-4f(0)-3DG]x+[DG-f(1)+2f(0)]$ for another subregion of $0.5 \leq x<1$, wherein DG designates a slope at said source data samples f(0) and f(1), wherein the step (c) is implemented in the scaling device.

14. The method as claimed in claim 13, further comprising:

(d) converting $f(x)=2[DG+f(0)-f(1)]x^2+[4f(1)-4f(0)-3DG]x+[DG-f(1)+2f(0)]$ for another subregion of $0.5 \leq x<1$ into $F(z)=2[(0)-f(1)+DG]z^2+(DG)z+f(1)$ for $-0.5 \leq z<0$, wherein Z-transform of $Z(z)=X(x)-1$ is applied, wherein the step (d) is implemented in the scaling device.

15. The method as claimed in claim 13, wherein D is defined to be $[f(0)-f(1)]$ and G is a gain factor.

* * * * *